United States Patent

[11] 3,534,825

[72] Inventor Anton M. Reffle
 Chicago, Illinois
[21] Appl. No. 750,260
[22] Filed Aug. 5, 1968
[45] Patented Oct. 20, 1970
[73] Assignee Eaton Yale & Towne Inc.
 Cleveland, Ohio
 a corporation of Ohio

[54] VEHICLE DRIVE AND STEER MECHANISM
 6 Claims, 6 Drawing Figs.
[52] U.S. Cl. .................................................. 180/42,
 280/93, 280/109, 180/65
[51] Int. Cl. .................................................. B62d 5/10,
 B60k 7/00
[50] Field of Search .......................................... 180/42,
 43(A), 52; 280/93, 95, 111, 109

[56] References Cited
UNITED STATES PATENTS

| | | | |
|---|---|---|---|
| 1,840,407 | 1/1932 | Norman | 180/43(A)UX |
| 2,242,454 | 5/1941 | Cochran | 280/95 |
| 2,713,918 | 7/1955 | Framheim | 180/52 |
| 2,913,063 | 11/1959 | Brown | 180/42 |
| 2,964,332 | 12/1960 | Ulinski | 280/95X |
| 3,031,024 | 4/1962 | Ulinski | 180/52X |
| 3,057,426 | 10/1962 | Hastings | 180/42 |

Primary Examiner—A. Harry Levy
Attorney—Teagno and Toddy

ABSTRACT: A material handling apparatus comprises a load support carried by front wheels and rear wheels. Means is provided for driving the rear wheels to power the apparatus. Moreover, a steering mechanism is provided for moving the rear wheels to effect steering thereof. The rear wheels are carried by a support plate which is pivotal about a horizontal axis. Pivotal mounting of the support plate permits the rear wheels to be disposed at different vertical distances from the load support. First and second motors are utilized for driving first and second rear wheels, and these motors are removably mounted on the underside of the plate and extend downwardly therefrom. The motors drive vertically extending drive shafts which rotate to effect rotation of the driving wheels about a horizontal axis through a pinion and ring gear set. The wheels which are driven by the drive shafts are supported by spaced supports for rotation about the axes of the respective vertical drive shafts by the steering mechanism for steering purposes. The steering mechanism includes a link member which is pivotally connected to the spaced supports and which is movable in a generally endwise direction to effect pivoting movement of the supports about the axes of the drive shafts. The construction and relationship of the link to the supports is such that a form of geometric steering is accomplished.

Patented Oct. 20, 1970

INVENTOR.
ANTON M. REFFLE
BY
Teagno & Toddy
ATTORNEYS

INVENTOR.
ANTON M. REFFLE
BY Teagno & Toddy
ATTORNEYS

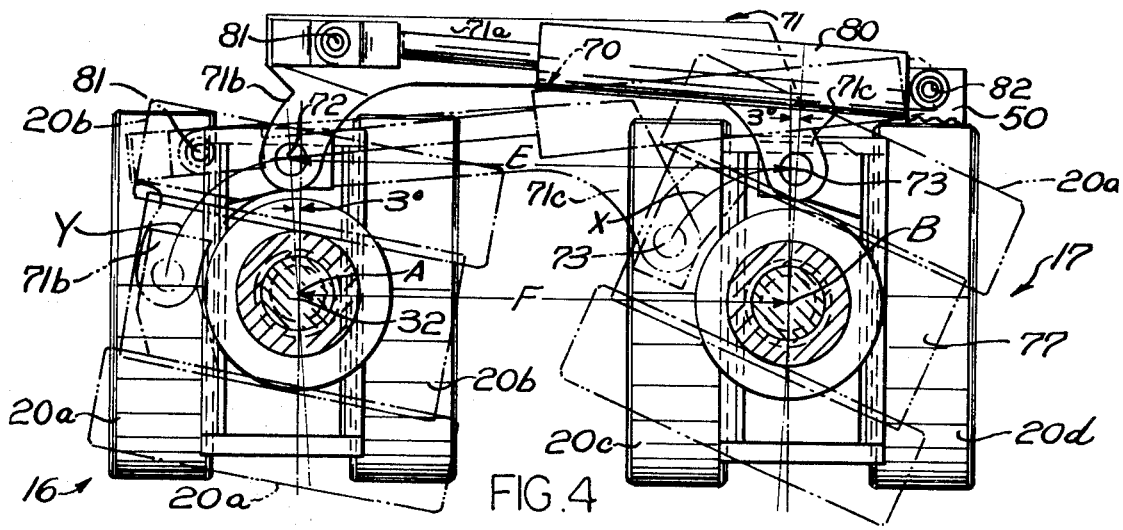

VEHICLE DRIVE AND STEER MECHANISM

The present invention relates to a material handling apparatus, and particularly relates to a material handling apparatus of the lift truck type having drive wheels which are also steered for purposes of both driving and steering the apparatus.

The principal object of the present invention is the provision of a new and improved material handling apparatus which includes steerable driving wheels and where the drive for the wheels and the steering thereof are effected in a manner to provide for turning the material handling apparatus in extremely narrow aisles and small spaces and, yet, maintain substantially full lateral stability for the apparatus during the turning by maintaining a substantially constant tread width dimension.

A further object of the present invention is the provision of a new and improved material handling apparatus which has steerable driving wheels and wherein the mechanism for steering and driving the wheels is a compact structure requiring a minimum of space and, yet, is extremely reliable in operation and relatively simple in construction.

Another object of the present invention is the provision of a new and improved material handling apparatus having driving rear wheels and a steering mechanism for steering the rear wheels which includes a means for simultaneously moving a first rear wheel a first angular distance about a first steering axis and a second rear wheel a second angular distance greater than the first angular distance about a second steering axis spaced from the first steering axis to provide for steering of the vehicle in extremely narrow spaces while maintaining the vehicle extremely stable.

A still further object of the present invention is the provision of a new and improved material handling apparatus having driving wheels carried on a support plate which is pivotal about a horizontal axis and wherein the driving wheels are driven by a plurality of motors which are carried by the support plate and which are mounted on the underside thereof and extend downwardly therefrom, thus providing a compact structure requiring a minimum of space on the apparatus.

Still another object of the present invention is the provision of a new and improved material handling apparatus having rear driving wheels which are driven upon rotation of spaced drive shafts and which are supported by first and second supports which are pivotal about the axis of the drive shafts for steering purposes, and wherein a steering mechanism is provided for steering the wheels to effect pivoting of said wheels about said drive shaft axes for steering purposes with the steering mechanism including a link member which is generally U-shaped so as not to interfere with the pivoting movement of the wheels.

A further object of the present invention is the provision of a new and improved material handling apparatus, as defined in the next preceding object, wherein the U-shaped link member is pivotally connected at its opposite ends with the wheel supports and wherein the pivotal connections of the link members to the rear wheel supports are spaced a greater distance than the distance between the steering axes for these respective wheels.

Further objects and advantages of the present invention will be apparent to those skilled in the art to which it relates from the following detailed description of a preferred embodiment thereof made with reference to the accompanying drawings in which:

FIG. 4 is a sectional view, taken along the line 4—4 of FIG. 3 and illustrating the steering mechanism of the vehicle;

FIG. 5 is a partial sectional view of the apparatus shown in FIG. 3 taken along the section line 5—5 of FIG. 3.

Figure 1:
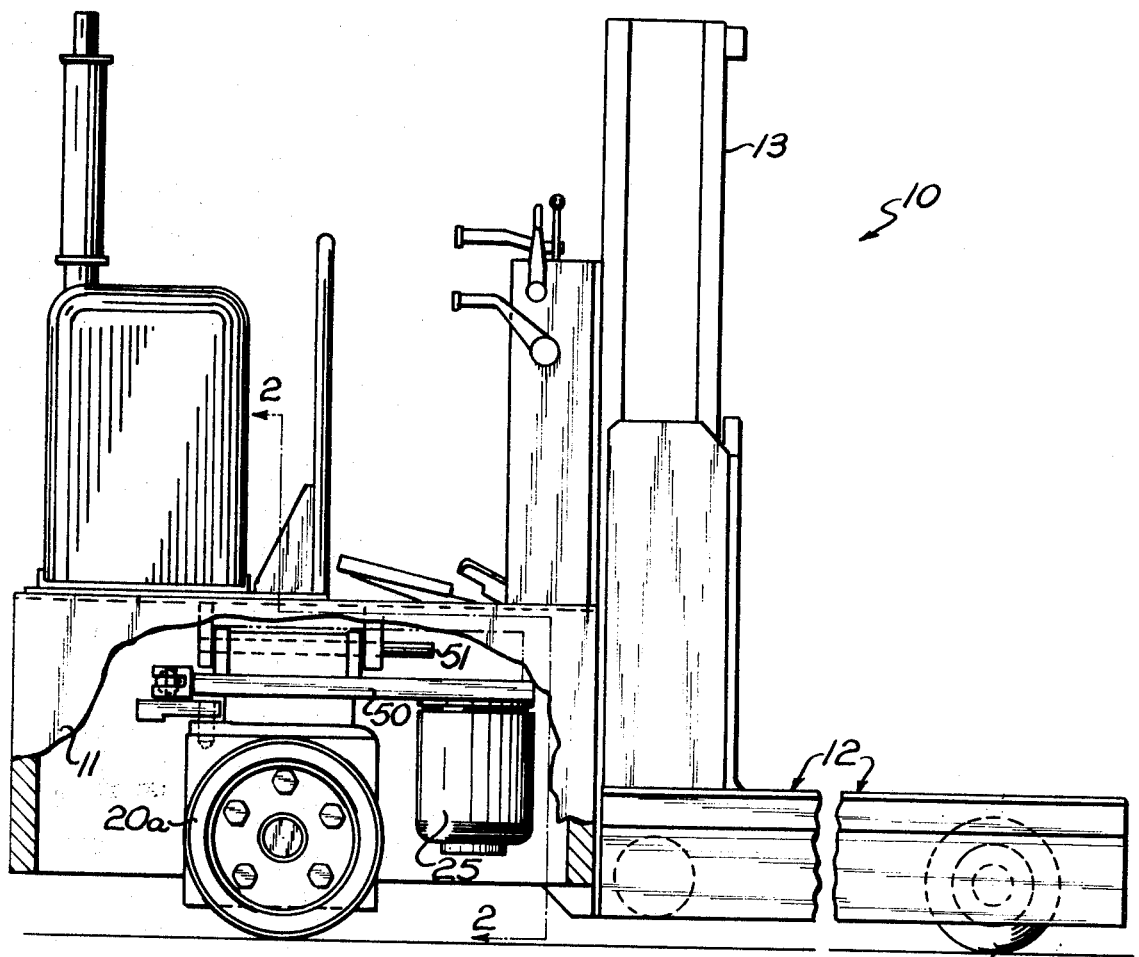
FIG. 1 is a schematic, partially sectional, side elevational view of a material handling apparatus embodying the present invention.

The present invention provides a new and improved materials handling apparatus, and particularly provides a new and improved materials handling apparatus having driving wheels which are also steered for purposes of driving and steering the materials handling apparatus. The present invention, in a preferred embodiment thereof, is in a materials handling apparatus of the lift truck type. The invention may be used in materials handling apparatus of different constructions and specifically lift trucks of different construction.

As representative of the present invention, the drawings illustrate the invention embodied in a lift truck 10. The lift truck 10 includes a load support 11 which carries the operator of the vehicle and on which the various operator-actuator controls are carried. The support 11 carries at its forward end a lift construction, generally designated 12, and which can be vertically moved along mast 13. The lift construction engages and carries a load in the convention and well-known manner, and accordingly, further description thereof will not be made.

The lift truck 10 includes a plurality of front wheels, designated 19, and two sets 16, 17 of rear wheels. The front and rear wheels carry the load support 11 and the lift structure 12. The front wheels are rotatable about a common fixed axis. The set 16 of rear wheels includes a pair of wheels 20a, 20b and the set 17 of rear wheels includes wheels 20c, 20d.

The rear wheels of the vehicle are powered or driven so as to effect movement of the lift truck 10 along the surface on which the lift truck is operating. Each set of rear wheels 20a, 20b and 20c, 20d are driven by separate drive means 21, 22, respectively. The drive means 21 which effects driving of the set 16 of rear wheels 20a, 20b is identical to the drive means 22 which effects rotation of the set 17 of rear wheels 20c and 20d and, therefore, only the drive means 21 for effecting rotation of the wheels 20a and 20b will be described herein in detail.

The drive means 21 which effects rotation of the wheels 20a and 20b includes a motor 25 which is supported in the materials handling apparatus 10, in a manner to be described hereinbelow. The motor 25 upon rotation drives a gear 26 which, in turn, meshes with a gear 27 which is carried on a shaft 28 which carries a gear 29. The gear 29 upon rotation effects rotation of an idler gear 30 which meshes with the gear 29 and which also meshes with a gear 31. The gear 31 is drivingly connected with a vertically extending drive shaft 32 which has a bevel pinion 33 on the end thereof adjacent the set of rear wheels 16. The bevel pinion 33 projects downwardly between the wheels 20a and 20b and drives the ring gear 34 of a conventional differential 35. It should be apparent that the motor 25 upon energization will drive the vertically extending drive shaft 32 and the drive shaft will in turn, effect rotation of the wheels 20a and 20b about a horizontal axis through the operation of the differential 35.

Figure 2:
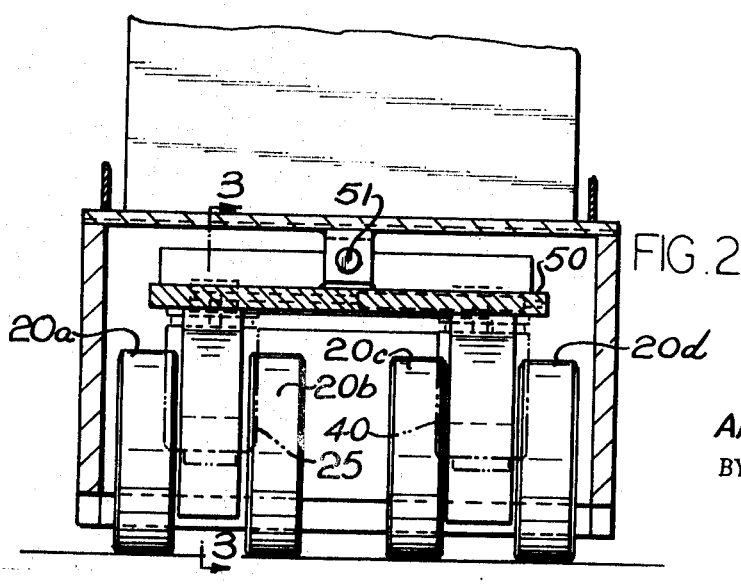
FIG. 2 is a schematic view, taken along the line 2—2 of FIG. 1.
Figure 3:
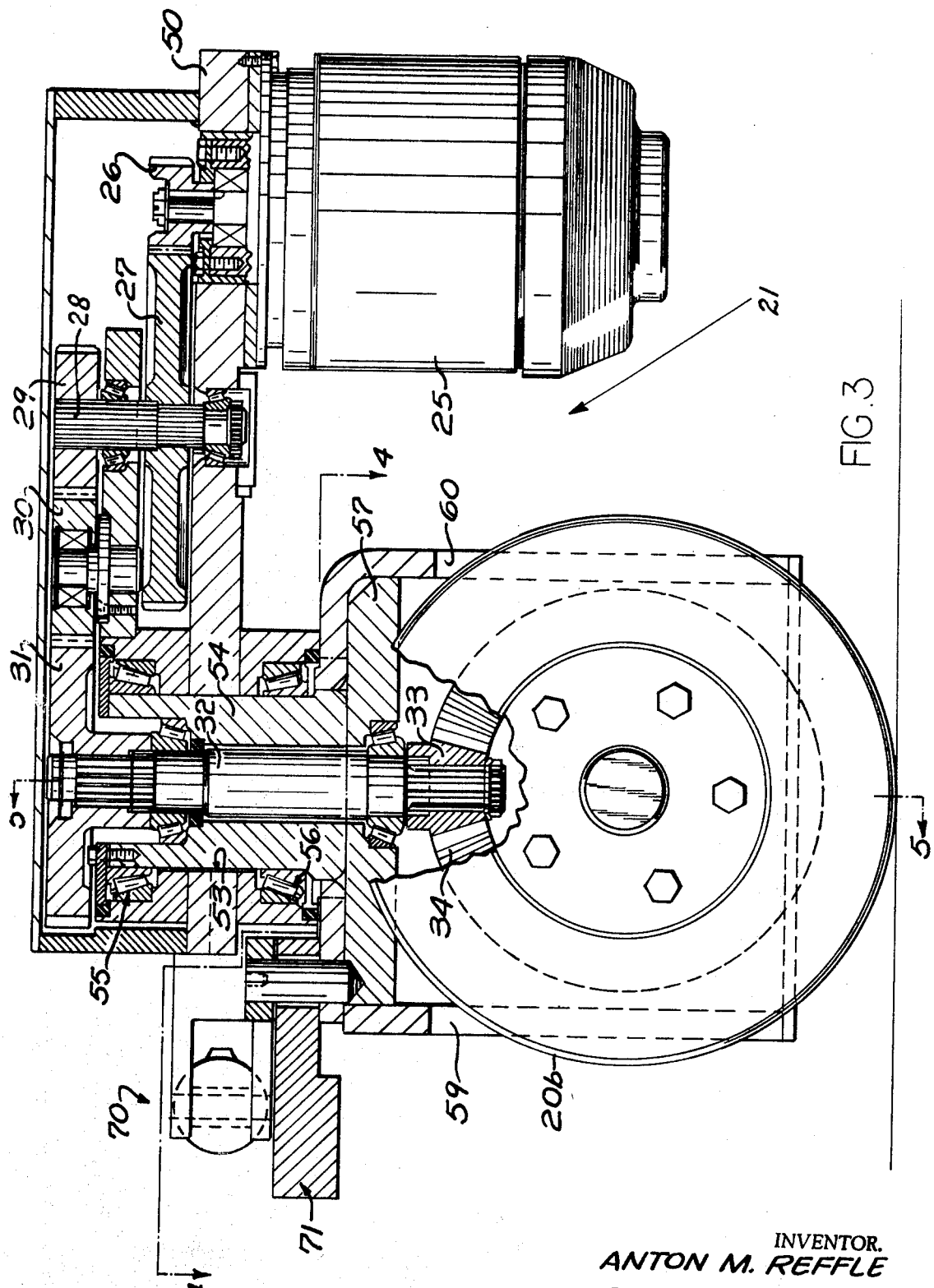
FIG. 3 is a sectional view, taken along the section line 3—3 of FIG. 2 and illustrating the drive for the wheels of the apparatus.

As noted above, the drive means 22 for the wheels 20c, 20d is identical in operation to the drive means 21 and includes a motor, generally designated 40 in FIG. 2, which drives the wheels 20c, 20d through gearing similar to that described in connection with wheels 20a, 20b, a vertically extending drive shaft 41 corresponding with shaft 32 and a differential.

It is to be noted, however, that the drive shaft 41 is drivingly associated with pinion and ring gears in such a manner that rotation of the drive shaft 41 in a direction opposite to the direction of rotation of the drive shaft 32 results in rotation of the wheel set 17 in the same direction as wheel set 16. The importance of this feature will be further described hereinbelow.

The motors 25 and 40 are supported by a horizontally extending plate 50. The motors specifically are removably secured to the underside of the plate 50 and extend downwardly and are disposed immediately adjacent to the rear wheels which they drive. This provides a compact structure requiring a minimum of space.

The plate 50, as noted, supports both motor 25 and motor 40 at spaced locations thereon. The plate 50 is supported, at a position intermediate the motors, for pivotal movement about an axis 51 of a pivot pin. The gears 26, 27, 28, 29, 30 and 31 are all supported by the support plate 50 is apparent from the drawings.

The support plate 50 also has a bore 53 located therein which receives a vertically extending sleeve member 54 in which the drive shaft 32 is located and through which the drive shaft 32 extends. The sleeve 54 is rotatably mounted by spaced bearings 55 and 56 for rotation in the bore 53 about the axis thereof, which coincides with the axis of rotation of the drive shaft 32. The lower end of the sleeve 54 terminates in a flange portion 57 which has spaced generally vertical plate portions 59 and 60 which extend downwardly therefrom and are located between the wheels 20a, 20b and support the wheels for pivotal movement relative to said support plate 50.

It should be apparent from the above description that one set of rear wheels 16, 17 could be disposed at a different vertical distance from the load support 11 of the vehicle than the other set of rear wheels. More specifically, it should be apparent that the rear wheels can tilt with respect to the support 11 about the shaft 51 of the support plate 50. This tilting movement results when the surface on which the lift truck 10 is moved, is uneven or slanted. The sets of wheels can compensate therefor merely by the pivoting action of the plate 50 about the axis of the pin 51. It should be apparent, of course, that the axis of pivoting movement of the plate 50 extends transverse to the axis G of rotation of the wheels in an unsteered position U and is located intermediate the sets 16, 17 of wheels.

It should be further apparent from the description hereinabove that the sleeve member 54 is rotatable in the bore 53 and upon rotation thereof in the bore 53 about the axis of the bore, the support for the wheels 20a, 20b, namely, the flange portion 57 and the plates 59, 60 will also rotate about the axis of the drive shaft 32. In order to effect steering of the vehicle 10, a steering mechanism, generally designated 70, is provided to effect rotation of the sets of wheels 20a, 20b about the axis of rotation of the drive shaft 32 and the set of wheels 20c, 20d about the axes of rotation of the drive shaft 41.

Thus, the axes of the drive shafts which transmit the rotary motion from the motors 25 and 40 to the sets of wheels 20a, 20b and 20c, 20d constitute steering axes for those respective sets of wheels. These steering axes are shown and designated A and B, in FIG. 4.

The steering mechanism 70 is constructed so as to provide for steering of the materials handling apparatus 10 in extremely narrow aisles and spaces without greatly affecting the stability of the vehicle.

The steering mechanism is of the type which provides for geometric, wide angle steering.

Figure 6:
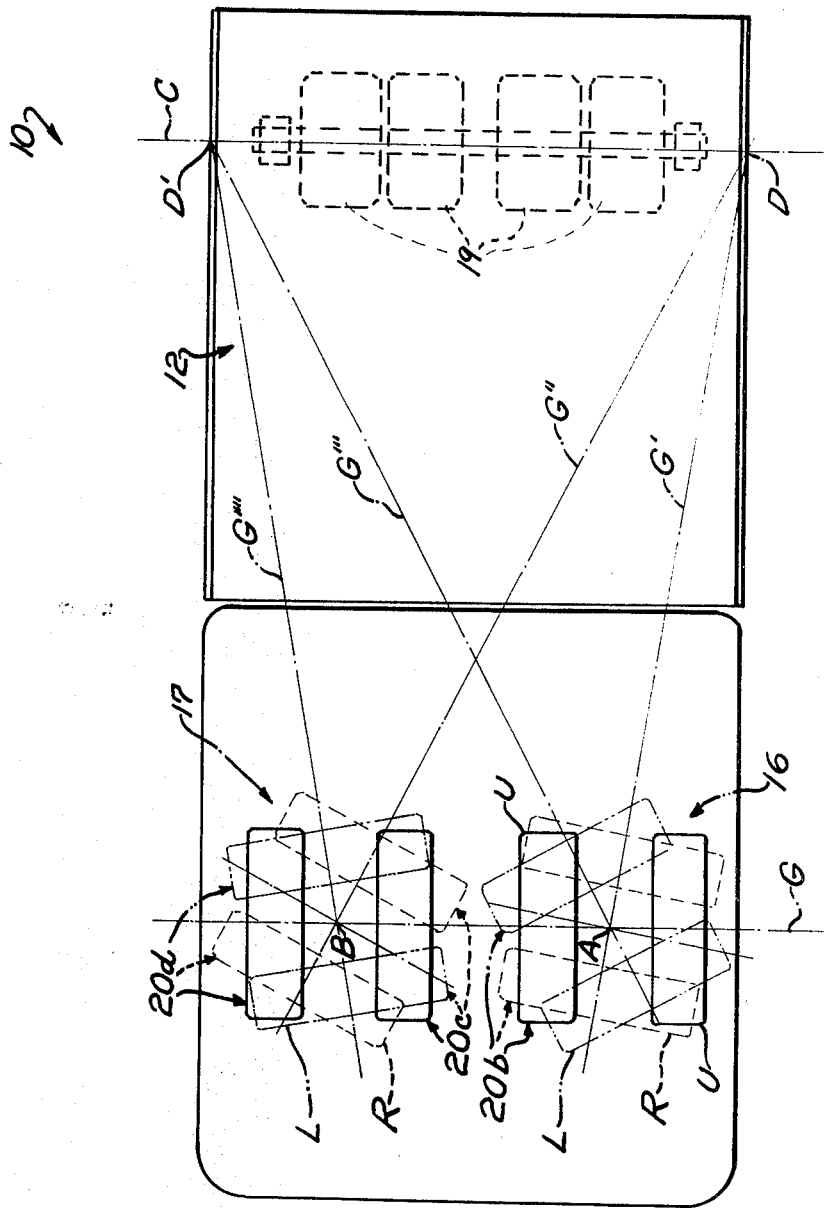
FIG. 6 is a schematic view of the apparatus of FIG. 1 illustrating the steering wheels in a steered position and showing further features of the invention of the present case.

Referring to FIG. 6, the geometric, wide angle steering, provides that the vehicle is steered, in either direction, about points, which lie on the axis C of rotation of the front wheels 19 of the vehicle. As shown in FIG. 6, wherein the wheels have been rotated by the steering mechanism 70 from an unsteered position U to the maximum steered positions R, L in which positions the steering is effected about points D, D' located approximately along the lateral edges of the vehicle and on the intersections of the axes G', G''and G''', G'''' where G represents the axes of rotation when the wheels 16, 17 are in the unsteered position U. It should also be apparent from FIG. 6 that the steering mechanism 70 has moved the sets of rear wheels different angular distances about the steering axes A and B.

The link member 71, best shown in FIG. 4, is of a generally U-shaped construction and has a base portion 71a and opposite leg portions 71b and 71c. The leg portion 71b is pivotally connected by a pivot pin 72 to the flange portion 57 forming a portion of the support for the set of wheels 16. The other end of the leg portion 71c of the link 71 is likewise pivotally connected to a support portion 77 for the set of wheels 17 corresponding with the support portion 57 for the set of wheels 16. It should be apparent from FIG. 4 that the distance E between the axis of the pivot pins 72, 73 is greater than distance F between the steering axes A and B. This distance is a result of the fact that the axes of the pivot pins 72, 73 are disposed in opposite directions from respective lines which extend through the steering axes A and B and perpendicular to the axis G of rotation of the rear wheels. More specifically, the axes of the pins 72, 73 are disposed approximately 3° from these lines, as shown in FIG. 4.

The link member 71 is moved in a generally endwise manner in order to effect pivoting movement of the sets of rear wheels 16, 17 about the steering axes A, B, respectively. The endwise movement of the link 71 is effected in the preferred embodiment by a power means in the form of a double acting hydraulic cylinder 80. The hydraulic cylinder 80 is pivotally connected to the link 71 by a pivot pin 81 located at one end thereof. The hydraulic cylinder 80 is also pivotally connected at 82 to the support plate 50. The hydraulic cylinder 80 is operated to effect movement of the link 71, and thereby effect steering of the materials handling apparatus 10, in a conventional manner by means of suitable controls and valving, which are well known in the art and will not be described herein in detail.

Due to the particular construction described hereinabove and the relationship of the distances between axes of the pins 72, 73 and the steering axes A, B, the link 71, upon movement thereof by the power means 80, effects movement of the sets of wheels 16, 17, respectively, through different angular distances about the respective steering axes A and B. This should be apparent upon viewing FIG. 4 wherein the set of wheels 17 has been moved an angular distance X, as indicated by the angular distance of movement of the pin 73, whereas the angular distance of movement of the set of wheels 16, as indicated by the movement of the pivot pin 72, is an angular distance Y. It should be clearly apparent that the angular distance Y is substantially in excess of the angular distance X and is on the order of 13° greater. Due to the geometry of the construction described, the apparatus 10 will be steered about points D, D' located along the axis of rotation C of the front wheels 19 of the vehicle, as noted hereinabove when the wheels 16, 17 are rotated to the maximum steering positions shown in FIG. 6, thereby enabling it to be turned in very narrow spaces. In steering from the unsteered position U toward the fully steered positions R, L, the intersection of the axes G', G'' and G''', G'''' will occur on the axis C of the front wheels 19 at varying lateral distances from the points D, D' depending on the direction and amount of steering angle. This, of course, is recognized as a preferred manner of steering and constitutes an important feature of the invention case particularly in view of relatively simple construction for accomplishing this desirable result.

Another important feature of the present invention is the comparative ease with which the motors 25, 40 may be removed for servicing and replacement when necessary. As can be seen in FIG. 4, the motor 25 is removably secured to the plate 50 by a plurality of fasteners 83. The plate 50 has a generally circular opening 84 therethrough through which the motor shaft 85 and gear 26 extend. The opening 84 is sufficiently large as to permit passage of the gear 26 therethrough without obstruction. It can be seen therefore, that motor servicing and replacement may be accomplished when necessary in an extremely simple manner. No other structure of the materials handling apparatus 10 need be disturbed in order to replace the motors 25, 40 nor is it necessary to unnaturally shift the position of the apparatus 10, such as by jacks or otherwise, in order to perform the necessary services on the motors.

Further to be noted, by reference to the statement made above that the drive shafts 32, 41 are driven in rotationally opposite directions while driving the wheels 16, 17 in the same rotational direction, is that the torque, necessary to drive the apparatus, from the drive motors 25, 40 acts in opposite directions and is effectively reacted by the steering link 71 with no adverse effect on the force necessary to steer the apparatus.

While the present invention has been described hereinabove in considerable detail, it should be apparent that certain modifications, changes, and adaptations may be made therein, and it is intended to cover all such changes, modifications, and adaptations which come within the scope of the appended claims.

I claim:

1. A materials handling apparatus comprising a support, front wheels and rear wheels carrying said support:

separate drive means for driving such of said rear wheels to power said support, each of said drive means including a substantially vertically extending drive shaft;

a plate pivotally mounted on said support, said plate supporting said rear wheels for pivotal movement about a horizontal axis and said drive means includes a plurality of motors one of which is drivingly associated with each of said drive shafts, each of said motors being mounted on the underside of said plate and extending downwardly therefrom; and a steering mechanism for pivotally moving said rear wheels to effect steering thereof, said steering mechanism including means supplying power for simultaneously moving a first rear wheel a first angular distance about a first vertical steering axis and a second rear wheel a second different angular distance about a second vertical steering axis and wherein driving and steering of said rear wheels occurs along a common vertical axis, said first steering axis corresponding with the axis of rotation of one drive shaft for one rear wheel and said second steering axis corresponding with the axis of rotation of another drive shaft for the second rear wheel.

2. Materials handling apparatus as defined in claim 1 wherein said support plate defines a plurality of openings through which at least a portion of each of said plurality of motors extends, and fastening means removably securing said motors to said support plate.

3. Apparatus as defined in claim 1 wherein said steering mechanism includes a member operatively connected with said first and second rear wheels and movable to effect movement of said first and second rear wheels about said first and second vertical axes respectively, and said means for supplying power includes a fluid-powered cylinder pivotally connected with said plate and having a piston rod pivotally connected with said member for effecting movement of said member.

4. Apparatus as defined in claim 3 wherein said motors rotate said drive shafts in opposite directions of rotation.

5. A materials handling apparatus comprising a support, a plurality of driving wheels carrying said support, means supporting said driving wheels for pivotal movement about a horizontal axis so that said wheels may be disposed at different vertical distances from said support, said means comprising a plate supporting said wheels and pivoted about the horizontal axis, a plurality of motors mounted on the underside of said plate, extending downwardly therefrom and disposed adjacent said wheels, separate drive means supported by said plate and drivingly connecting each motor with at least one drive wheel for rotating said drive wheel about a general horizontal axis and means for rotating said wheels about a vertical axis relative to said plate to effect steering of said apparatus:

wherein said drive means includes a vertically extending drive shaft for each of said driving wheels, and said steering mechanism comprises means for effecting pivotal movement of said driving wheels about spaced steering axes which correspond with the axes of rotation of said drive shafts.

6. A materials handling apparatus as defined in claim 5 wherein said steering mechanism comprises a link member operatively connected at opposite ends thereof with spaced rear wheels and power means pivotally connected with said link and pivotally connected with said plate for effecting said pivotal movement of said rear wheels.